May 3, 1949. C. R. WAGNER 2,468,904
PRODUCTION OF CARBON BISULFIDE
Filed Aug. 10, 1945
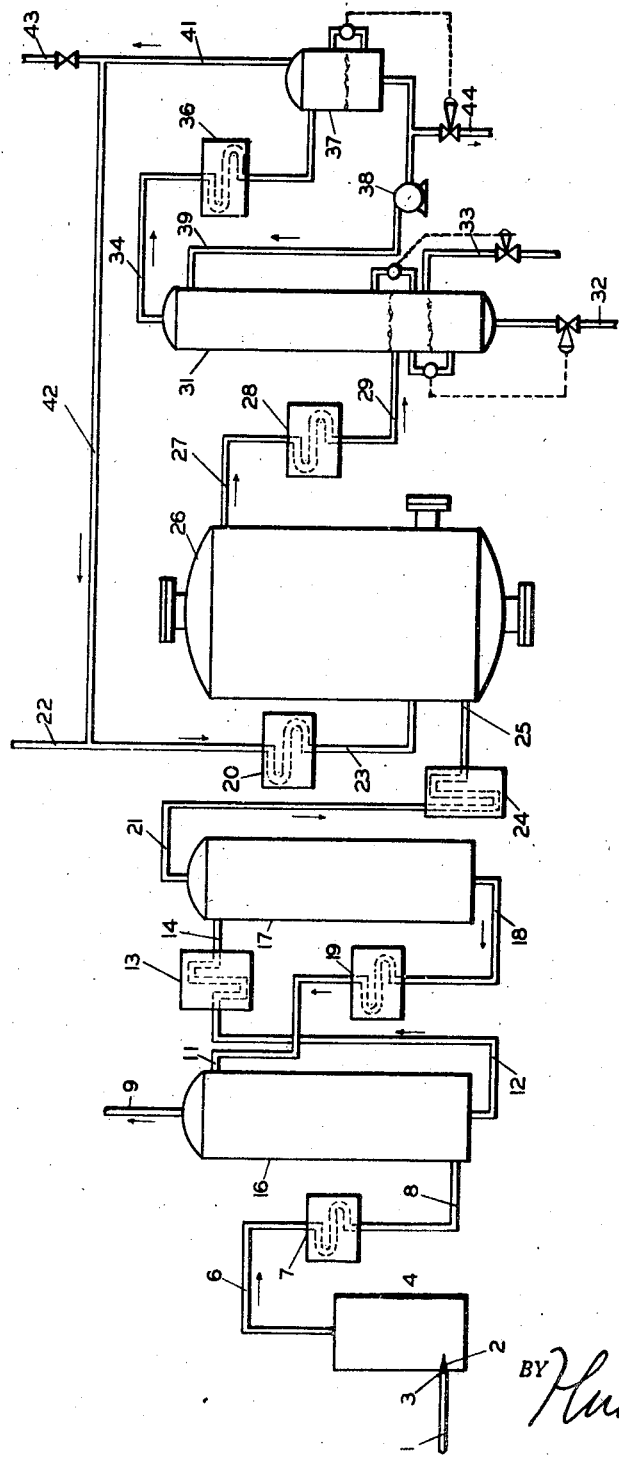
INVENTOR.
C. R. WAGNER
BY Hudson & Young
ATTORNEYS Patented May 3, 1949

2,468,904

UNITED STATES PATENT OFFICE 2,468,904

PRODUCTION OF CARBON BISULFIDE

Cary R. Wagner, Utica, Ohio, assignor to Phillips Petroleum Company, a corporation of Delaware Application August 10, 1945, Serial No. 610,180

10 Claims. (Cl. 23—206)

This invention relates to a method for the disposal of hydrogen sulfide. In one of its more specific aspects it relates to a low temperature catalytic method for the production of carbon bisulfide in which normally waste hydrogen sulfide can be used as charging stock.

One method for the production of carbon bisulfide involves heating methane and hydrogen sulfide to temperatures of 1100° C. or higher. The equilibrium of this reaction allows only 67 per cent conversion to carbon bisulfide at 1100° C. Actual yields are considerably lower due to undesirable side reactions. At higher temperatures, a more favorable equilibrium may result, but actual yields are usually not more than 55 per cent of theory.

Another method has been suggested in which methane gas and sulfur vapors are passed over a metal sulfide catalyst at temperatures varying from 750° C. to 1100° C. At 750° C. only 50 per cent conversion was obtained, but at higher temperatures conversion was increased.

Still another method involves passing a mixture of methane and hydrogen sulfide over an earthenware catalyst at 1000° C. yielding 50 per cent carbon bisulfide based upon the sulfur of the hydrogen sulfide. Still another method utilizes molten sulfur at 450–700° C. as a source of sulfur for converting a white mineral oil to carbon bisulfide.

A more recent method involves passing a mixture of methane and sulfur or substances yielding sulfur at preferably 450–700° C. over a catalyst consisting of silica gel, fuller's earth, bauxite or Al₂O₃, either alone or activated with one or more compounds of the metals of groups V, VI, VII or VIII of the periodic system.

Molten sulfur at high temperatures presents corrosion problems which at times become serious.

High temperature reactions so frequently produce relatively low yields of CS₂.

To overcome these disadvantages and objections of prior methods, I have devised a method for the production of carbon bisulfide at relatively low temperatures. The yield of the CS₂ is also relatively high when compared to other processes.

One object of my invention is to provide a low temperature process for the manufacture of carbon bisulfide.

Another object of my invention is to provide a low temperature process for the production of carbon bisulfide with a high product yield.

Still another object of my invention is to provide a low temperature process for the production of carbon bisulfide in which corrosion of equipment is reduced to a minimum.

Yet another object of my invention is to provide a process for the manufacture of carbon bisulfide wherein normally waste materials are utilized as charge stocks.

These and other objects and advantages will be apparent to those skilled in such art by reference to the following detailed description and annexed drawing which respectively describes and illustrates a preferred embodiment of my invention, and wherein, The figure shows diagramatically one form of apparatus in which the process of my invention may be carried out.

By the process of my invention, H₂S is burned in oxygen or air to form SO₂, which is then mixed with additional H₂S and CH₄ or other hydrocarbon added and the mixture passed over a silica-alumina catalyst at a temperature of 300° to 500° C. Products of the process are CS₂, H₂O and unused CH₄ and H₂S. The CS₂ and water are condensed from this product mixture, the CS₂ being withdrawn as a liquid for further purification, the water discarded and the CH₄ and H₂S containing some moisture recycled to the catalyst chamber.

Referring to the drawing, numeral 4 refers to a combustion chamber, vessel 16 and vessel 17 are an absorber and stripper, respectively, vessel 26 a catalyst chamber, vessel 31 a fractionator, and vessel 37 is a reflux accumulator.

As raw materials for the process there may be used the waste H₂S removed from natural gas or other hydrocarbons, the disposal of which is frequently a major problem in processing certain crude oils, and methane, natural gas, or other hydrocarbon. The hydrocarbons used may be in the form of substantially pure compounds, or mixtures of hydrocarbons, or they may contain large quantities of H₂S as in the case of "sour" gas found in many localities. In certain instances it is found advantageous to employ as feed to the process a "sour" gas of high H₂S content together with sufficient added H₂S to maintain a desired ratio of reactants, and to supply the SO₂ requirement by burning a relatively pure H₂S from an extraneous source.

While silica-alumina is a preferred catalyst, I have found that silica gel, fuller's earth, bauxite, activated alumina, and various clays may also be used.

The oxidation of the hydrogen sulfide to sulfur dioxide may be carried out in any known manner, as is the recovery and purification of the sulfur dioxide so produced. The hydrogen sulfide may be burned in air in which case the sulfur dioxide is contaminated with a considerable quantity of atmospheric nitrogen. As an alternative, though more expensive to operate, the hydrogen sulfide may be burned in oxygen with the production of only sulfur dioxide and water. This latter compound is not difficult to separate from the sulfur dioxide.

The hydrogen sulfide which is burned to produce the sulfur dioxide should preferably be a fairly pure product. By using a reasonably pure hydrogen sulfide and burning with oxygen to produce the sulfur dioxide, water is the only impurity present, and in certain cases it need not be separated. When $CH_4$ is present in the hydrogen sulfide and the mixture is burned, a larger proportion of water is formed in addition to some $CO_2$ and possibly some CO when an excess of oxygen is not used. In case much methane is present, then the $CO_2$ will build up in concentration in a later recycling step.

As mentioned above the $H_2S$ may be burned to $SO_2$ in the presence of air, but obviously the use of air permits entrance of a considerable quantity of $N_2$, and this gas not being a reactant of the process will build up markedly in concentration in a subsequent step. One means to prevent the pyramiding of the nitrogen is to purify the $SO_2$ following its production. This purification can be accomplished through the use of a "Girbotol" type purifier in which the $SO_2$ is absorbed by an amine solution at a relatively low temperature then removed therefrom at a higher temperature. Such processes are well known in the art and by the use of which the contaminating nitrogen can be rejected while the $SO_2$ emerges in a relatively pure condition. Such a step also serves to remove the water formed during the formation of the $SO_2$.

In case methane was present in the $H_2S$ stream prior to the formation of the $SO_2$, the Girbotol extracted sulfur dioxide will contain carbon dioxide. The presence of this latter gas, which is relatively inert, may not be expected to interfere with the $CS_2$ forming step, the main disadvantage being that the final effluent gas containing $H_2S$ and some $CH_4$ and recycled to the catalytic step will also contain this $CO_2$ and continued recycling will permit building up of the $CO_2$ concentration. Of course, a fraction of this gas containing stream may be bled off to prevent undue pyramiding of the $CO_2$.

As regards the presence of $CO_2$ and/or $N_2$, the main point is to make certain that a sufficient quantity of reactants in a proper ratio are admitted to the catalytic reactor so that the following reactions may take place.

$$2H_2S + SO_2 \rightarrow 3S + 2H_2O$$

and $$4S + CH_4 \rightarrow CS_2 + 2H_2S$$

By combining these two reactions into a single equation, $$4SO_2 + 2H_2S + 3CH_4 \rightleftarrows 3CS_2 + 8H_2O$$

it is obvious that the charge stock to the catalytic reactor should contain 4 volumes of $SO_2$ and 2 volumes $H_2S$ for each 3 volumes of $CH_4$. Since this overall reaction is apparently a reversible reaction, yields greater than the normal equilibrium yield can be obtained. It is known that the equilibrium of reversible reactions can be shifted by increasing the concentration of one or more of the reactants. To accomplish this in the above reaction I merely add more $H_2S$ to the reactant materials than the stoichiometric equation requires, as for example, I have found that by adding 8 volumes of $H_2S$ in place of 2 volumes to the 3 volumes of $CH_4$ and 4 volumes of $SO_2$, that the equilibrium is shifted considerably as is evidenced by a material increase in yield of $CS_2$ based upon the methane. While these volume relations are given, they are intended to be exemplary since these values may be changed over rather wide limits without seriously impairing the process.

A particular feature of the present process is the low temperature at which it is carried out. Prior processes for making $CS_2$ from hydrocarbons and sulfur or sulfur compounds are operated at temperatures from about 350° C. to 1100° C., with about 500° C. as the minimum when methane is the source of carbon. I have obtained good yields of $CS_2$ by reacting $CH_4$ or natural gas at temperatures as low as 300° C. to 350° C. These low temperatures permit substantial savings in equipment costs and maintenance, as well as lower operating costs.

Another important advantage of my process results from the use of sulfur dioxide with hydrogen sulfide instead of hydrogen sulfide alone or in place of free sulfur vapor. Processes using $H_2S$ alone require temperatures from 750° to about 1100° C., while those using sulfur vapors are subject to serious corrosion problems met in melting and vaporizing sulfur.

In my process it is possible that the successful low temperature operation may be due to the formation of elementary sulfur in a nascent state by reaction of sulfur dioxide upon the hydrogen sulfide. By adding the sulfur dioxide to a mixture of hydrogen sulfide and methane, as the sulfur dioxide reacts with the hydrogen sulfide to form sulfur, the latter as formed is apparently in an extremely finely divided and reactive state in which condition it is susceptible to rapid reaction with the methane.

In the operation of my process using the apparatus illustrated in the figure, hydrogen sulfide, from a source not shown, passes by way of a line 1 through a burner 2 into a combustion chamber or furnace 4. Air for this combustion is admitted through an adjustable air inlet 3.

The combustion gases containing sulfur dioxide, nitrogen, moisture and oxygen in case an excess of air was admitted to the burner pass from the combustion box 4 by way of a pipe 6, through a cooler and a pipe 8 into an absorber vessel 16. These gases pass upward in this absorber, which may be a conventional bubble cap type contacting column, a packed column, or such a vessel as will promote intimate contact between countercurrently flowing gas and liquid absorbent. A Girbotol type of amine solution or such other absorbent as will be suitable for use with sulfur dioxide may be used. This absorbent with its charge of sulfur dioxide passes from the base of the absorber by way of a line 12, through a heater 13 and a line 14 into the top of a stripper column 17. The rich absorbent heated on passage through the heater 13, releases the absorbed sulfur dioxide in this stripper. Lean absorbent then passes from the base of this column through a lean absorbent line 18, a cooler 19 on through a line 11 into the top of the absorber to complete the absorption liquid cycle.

The absorber off gas free of sulfur dioxide leaves the absorber by way of a pipe 9 for such disposal as desired.

As mentioned hereinbefore, if relatively pure hydrogen sulfide is burned with oxygen in the combustion chamber 4, this sulfur dioxide absorption step is not necessary. The economics of the problem may well be the deciding factor in this respect since the cost of oxygen may be balanced against the cost and operation of a sulfur dioxide purification unit.

Sulfur dioxide passes from vessel 17 through a line 21, a heater 24 and on through a line 25 into a catalytic reactor vessel 26. The mixture of hydrogen sulfide and methane, from a source not shown, pass from a line 22 into a charge line 23 and into the catalyst containing vessel 26 at a point near its base. This charge line 23 contains a heater means 20 for preheating the hydrogen sulfide-methane stock to reaction temperature. Effluent gases from the catalyst chamber pass through a line 27, to a cooler 28 and on through a pipe 29 to the lower portion of a fractionator or separator column 31. The cooler 28 cools the gas stream sufficiently that steam formed in the reactor 26 or moisture carried in by the $H_2S$—$CH_4$ gas will be condensed along with the carbon bisulfide. The condensed water and carbon bisulfide drain to the bottom of the vessel 31 and separate into two layers, the carbon bisulfide on the bottom since it is specifically heavier than the water. Some moisture and carbon bisulfide vapors pass from the separator 31 by way of an overhead line 34, are cooled or chilled in a chiller 36 for condensation of the carbon bisulfide. This chilled condensate separates out in a separator vessel 37 which serves as a reflux accumulator. Cold condensate from this accumulator passes through a pump 38 and a line 39 to the top tray of the separator vessel 31. This cold condensate which consists of cold liquid carbon bisulfide and cold water serves to assist in condensing or stripping carbon bisulfide from vapors flowing upward in the tower. Uncondensed gas accumulating in vessel 37 when containing sufficient $CH_4$ and/or $H_2S$ may be passed through a line 41 and on through a line 42 to be added to the $H_2S$—$CH_4$ charge stock as recycle. In case carbon dioxide or other inert or undesired gas accumulates in this recycle circuit, the uncondensed gas may be separated from the liquid in the accumulator 37 and may be bled off through lines 41 and 43 to such disposal as desired, or a fraction of said gas may be continuously bled off to prevent undue building up of the concentration of undesirable constituents.

Natural gas can be used as the source of carbon for this catalytic formation of carbon bisulfide. A sour natural gas, that is, one containing hydrogen sulfide, can be used as feed to the catalytic reactor. Ordinarily, however, sour natural gases as produced from gas wells do not contain sufficient hydrogen sulfide, that is, the mol ratio of $H_2S$ to $CH_4$ is not sufficiently great to meet the mol ratio requirements as mentioned hereinbefore, and for my process additional hydrogen sulfide should be added to give the proper mol ratio in order to obtain a maximum carbon bisulfide yield. This additional or supplemental hydrogen sulfide can originate from any source whatever providing it does not contain excessive amounts of undesirable impurities. Other hydrocarbons than methane can be used, such as ethane, propane or even heavier hydrocarbons or mixtures of hydrocarbons. Natural gas containing largely methane but some ethane, propane and even heavier hydrocarbons serves well as the source of carbon for my catalytic reaction. Higher boiling hydrocarbons including those which are normally liquid, or even oily fractions, may be used. In addition, unsaturated hydrocarbons, such as the olefins, may be used as the carbon containing charge stock. For example, a refinery stream of hydrocarbons containing some saturated and some unsaturated hydrocarbons with or without hydrogen sulfide may be used. Hydrogen sulfide from a refinery source such as that resulting from hydrocarbon purification processes and normally being a waste product may be added to the hydrocarbon charge stock to supplement the hydrogen sulfide already present or to supply the entire amount of hydrogen sulfide. As mentioned hereinbefore, a sour or hydrogen sulfide containing natural gas with additional hydrogen sulfide serves well in my process.

*Example*

As an example of the operation of the process of my invention a stream of raw natural gas (90 per cent $CH_4$) containing sufficient added hydrogen sulfide to bring the mol ratio of $H_2S$ to $CH_4$ up to approximately 8:3 was heated to a temperature of 350° C. and passed into a catalyst chamber containing a silica-alumina catalyst of 4 to 20 mesh size. A stream of sulfur dioxide was preheated to about 350° C. and added to the hot $H_2S$—$CH_4$ stream at the point of addition of the latter to the catalyst chamber. The rate of flow of the $SO_2$ stream was adjusted so as to supply 1 mol of $SO_2$ for each 2 mols of $H_2S$. The catalyst bed was 6 inches in height by 2 inches in diameter. These gases were forced through the catalyst under sufficient pressure to permit a contact time of about 1 second. The effluent gases from the catalyst containing $CS_2$ were cooled to approximately room temperature in a series of cooling coils. The $CS_2$ recovered amounted to approximately 15 gallons per 1,000 cubic feet $CH_4$ charged, which yield was 75 per cent of theoretical based on the methane.

By use of my low temperature process special, chemically resistant equipment is not needed. Molten sulfur is not handled in any step so difficulties common thereto are not encountered.

As mentioned hereinbefore, the mol ratio of the sulfur dioxide, hydrogen sulfide and methane reactants entering the catalytic reactor need not be specifically the ratios given since they may be altered considerably and yet permit good yield production of sulfur disulfide. For example increasing the concentration of the reactant methane should have about the same effect as an increase in the concentration of the reactant hydrogen sulfide. The concentration of any of the reactants may be varied within limits without serious reduction of carbon bisulfide yield.

If the cooler 28 operating on the hot gaseous product stream from the catalytic reactor is operated in such a manner as to cool or chill the effluent to the required degree, the fractionator type separator vessel 31 may be omitted. Under such conditions the chilled condensate and gases may pass directly into an accumulator vessel such as vessel 37. In this vessel the carbon bisulfide settles to the bottom and may be withdrawn for purification or such disposal as desired. A water layer accumulates on top of the carbon bisulfide and may be withdrawn for disposal as desired. Uncondensed gas containing hydrogen sulfide and/or methane may be recycled to the catalytic reactor as hereinbefore explained, or a portion bled off to prevent undue pyramiding of undesired constituents.

I do not wish to be limited in any manner by any theory or explanation as to why my process operates as it does since reasons as to why the carbon bisulfide forms in good yield at such low temperatures are not definitely known. Many alterations and variations in my process operation may be made and yet remain within the intended spirit and scope of my invention.

Having described my invention, I claim:

1. A method for the disposal of hydrogen sulfide and the simultaneous production of carbon bisulfide comprising reacting said hydrogen sulfide with a hydrocarbon in the fluid state and sulfur dioxide in the presence of a catalyst at a temperature below about 500° C. and recovering the carbon bisulfide.

2. A method for the production of carbon bisulfide comprising reacting hydrogen sulfide, sulfur dioxide and a hydrocarbon in the gaseous state in the presence of a catalyst at approximately 300° to 500° C. and recovering the carbon bisulfide.

3. A method for the production of carbon bisulfide comprising reacting hydrogen sulfide, sulfur dioxide and a gaseous hydrocarbon in the presence of a silica-alumina catalyst at approximately 300° to 500° C. and recovering the carbon bisulfide.

4. A method for the production of carbon bisulfide comprising reacting hydrogen sulfide, sulfur dioxide and a hydrocarbon gas comprising methane in the presence of a catalyst at approximately 300° to 500° C. and recovering the carbon bisulfide.

5. A method for the production of carbon bisulfide comprising reacting hydrogen sulfide, sulfur dioxide and a hydrocarbon gas comprising methane in the presence of a silica-alumina catalyst at a temperature within the approximate limits of 300° to 500° C. and recovering the carbon bisulfide.

6. A process for the production of carbon bisulfide from hydrogen sulfide and a hydrocarbon gas comprising methane comprising the steps of burning hydrogen sulfide in the presence of an oxygen containing gas to produce sulfur dioxide, passing said sulfur dioxide with said hydrocarbon gas comprising methane and additional hydrogen sulfide into a reaction vessel containing a catalyst within the approximate temperature limits of 300° C. to 500° C., removing the gaseous effluents from the reaction chamber, cooling said effluents to produce condensate, separating said condensate from uncondensed gas, recycling the uncondensed gas into the reaction vessel and removing condensate as a product of the process.

7. The process of claim 6 wherein the catalyst is a silica-alumina catalyst and the recycled gas contains hydrogen sulfide.

8. The process of claim 6 wherein the oxygen containing gas is air, and said sulfur dioxide is purified from contaminating atmospheric nitrogen, the purified sulfur dioxide being then passed to the catalytic chamber with the additional hydrogen sulfide and methane.

9. A process for the production of carbon bisulfide from a sour natural gas containing hydrogen sulfide comprising the steps of burning hydrogen sulfide in the presence of air to form sulfur dioxide containing nitrogen as an impurity, removing the nitrogen from said sulfur dioxide, passing said sulfur dioxide and said sour natural gas into a reaction chamber containing a silica-alumina catalyst at a temperature within the approximate limits of 300° C. to 500° C., removing the gaseous effluents from the reaction chamber, cooling said effluents to produce condensate, separating said condensate from uncondensed gas, recycling the uncondensed gas to the reaction vessel and removing condensate as a product of the process.

10. The process of claim 9 wherein the sour natural gas is supplemented with additional hydrogen sulfide.

CARY R. WAGNER.

REFERENCES CITED

The following references are of record in the file of this patent:

UNITED STATES PATENTS

| Number | Name | Date |
|---|---|---|
| 1,735,409 | Pier et al. | Nov. 12, 1929 |
| 1,967,264 | Rosenstein | July 24, 1934 |
| 2,123,000 | Carter | July 5, 1938 |